UNITED STATES PATENT OFFICE.

GUSTAV H. RABENALT, OF LANCASTER, NEW YORK, ASSIGNOR TO GOULD STORAGE BATTERY COMPANY, A CORPORATION OF NEW YORK.

STORAGE-BATTERY SEPARATOR.

1,363,754.   Specification of Letters Patent.   Patented Dec. 28, 1920.

No Drawing.   Application filed March 30, 1918.   Serial No. 225,660.

*To all whom it may concern:*

Be it known that I, GUSTAV H. RABENALT, a citizen of the United States, residing in Lancaster, county of Erie, and State of New York, have invented new and useful Improvements in Storage-Battery Separators, of which the following is a description.

My invention pertains to that class of devices known as battery separators which are ordinarily used to separate the plates of an electric battery, and are, therefore, partly or wholly immersed in the solution or electrolyte thereof.

As it is highly important that such separators should be impervious to even very minute particles of the material comprising battery elements, and at the same time pervious to the solution or electrolyte, they are often made of wood, as these characteristics are possessed in different degrees by various kinds of that material. Untreated wood is affected, and more or less decomposed, by the battery solution and electrolytic action taking place in the battery, and in many types of battery is caused to liberate constituents or products, causing detrimental action to the cells. It is, therefore, usual to treat the wooden separators before use in a battery in some manner to deprive the same of such constituents as might injuriously affect the battery. Such treatment as ordinarily employed characterizes the separator by the properties of warping, curling and splitting, when dry. Therefore, it is usually necessary to keep such separators in water until they are to be used, and they are ordinarily transported and handled in water or in a soaked condition, in order that they may be kept from warping or splitting or otherwise becoming unfit for use.

My invention provides a satisfactorily treated separator which, in a dry condition, is not characterized by such detrimental qualities as warping, splitting, curling or disintegration, but may be kept in stock, shipped and handled in a dry condition ready for immediate use.

My method of producing such a separator is substantially as follows:

I first form the desired shape and size of separator from suitable wood. I then chemically treat the wood in such manner as to remove the constituents which might have a deleterious effect upon the operation of the battery, and then wash the same thoroughly in pure water in order to remove any chemicals which may have been used in the process, and to carry off such constituents as have been taken out of the wood. I then drain the separators and hold them in any suitable manner which will restrain them from warping; and, while so held, I dry them *in vacuo* or at a pressure quite below ordinary atmospheric pressure until I have extracted sufficient of the moisture that the wood has substantially the same degree of moisture as it naturally would have under ordinary atmospheric conditions if well seasoned in the open air.

One wood which I find very suitable for the employment of my invention is cedar; and one method of treating the same to remove deleterious constituents or products is to soak the separators in a mild solution of caustic potash or caustic soda and then wash them in several changes of water. The separators may then be held in any suitable manner, as between ordinary hand clamps, so that they cannot warp during drying, and then dried in an ordinary commercial vacuum drier at a temperature in the neighborhood of 50 to 70 degrees Fahrenheit, at a pressure of about one inch of mercury, until the moisture content is approximately say 12 or 15%, or substantially the usual content of such wood when seasoned in ordinary atmospheric air.

I do not wish to limit myself in any way to the exact method or product described herein to illustrate one embodiment of my invention, as considerable departure both in the nature of my improved separator and in the method of producing it may be made without departing from the spirit and scope of my invention, which is as set forth in the following claims:

1. A battery separator composed of wood from which some of the natural constituents have been extracted and containing its natural moisture content.

2. A battery separator composed of wood deprived of certain of its constituents and having substantially its natural moisture content for preventing warping and splitting when exposed to the atmosphere.

3. A battery separator composed of wood deprived of some of its natural constituents and containing those rendering it capable of withstanding ordinary climatic changes in the atmosphere without deleterious warping and splitting.

4. A battery separator composed of wood deprived of certain of its constituents and containing substantially its natural moisture content whereby it is protected against warping and splitting when exposed to the action of atmospheric air.

5. A battery separator composed of wood deprived of certain of its constituents and retaining those rendering it capable of withstanding exposure to atmospheric air and retaining its physical properties substantially unaltered thereby.

6. A battery separator composed of wood deprived of some of its natural constituents while retaining others thereof, said retained constituents having associated therewith a moisture content substantially equal to the normal moisture content of the wood when dried in air for the purpose of preventing warping and splitting of the separator when exposed to atmospheric air.

7. The method of making wooden battery separators which consists in subjecting the wood to a liquid bath and subsequently drying the same under the influence of heat at a pressure below that of the atmosphere.

8. The method of making wooden separators for use in storage batteries comprehending soaking the same and then drying *in vacuo*.

9. The method of making wooden separators for use in storage batteries which comprehends soaking the same to remove certain constituents and afterward drying *in vacuo*.

10. The method of making wooden separators for use in storage batteries which comprehends soaking the same to remove certain constituents and afterward drying *in vacuo* until the moisture content is substantially equal to that of the natural wood dried in air.

11. The method of making wooden separators for batteries comprehending soaking the same in a chemical bath to affect certain constituents thereof, washing the same to extract the chemicals and said constituents, and subsequently drying the same *in vacuo*.

12. The method of making wooden separators for batteries comprehending soaking the same in a chemical bath to affect certain constituents thereof, washing the same to extract the chemicals and said constituents, and subsequently drying the same *in vacuo* until the moisture content is substantially the same as that of the natural wood air dried.

13. The method of making wooden separators for batteries which comprehends chemically treating the wood to remove constituents which might deleteriously affect the operation of the battery, removing the chemicals therefrom and then drying the same *in vacuo*.

14. The method of making wooden separators for batteries which comprehends chemically treating the wood to remove constituents which might deleteriously affect the operation of the battery, removing the chemicals therefrom, and then drying the same *in vacuo* until the moisture content is substantially the same as that of the natural wood air dried.

15. The method of preparing wooden separators for batteries which consists in impregnating the same with chemicals acting upon certain constituents thereof, washing out the chemicals and certain affected constituents, and then drying *in vacuo*.

16. The method of preparing wooden separators for batteries which consists in impregnating the same with chemicals acting upon certain constituents thereof, washing out the chemicals and certain affected constituents, and then drying *in vacuo* until the moisture content is substantially the same as that of the natural wood air dried.

17. The method of preparing wooden separators for batteries which consists in impregnating the same with chemicals acting upon certain constituents thereof, washing out the chemicals and certain affected constituents, and then drying *in vacuo* while restrained from warping until the moisture content is substantially the same as that of the natural wood air dried.

18. The method of preparing wooden separators for batteries which comprehends impregnating the wood with chemicals affecting certain constituents, washing out the chemicals and affected constituents, confining the wood while still wet to prevent warping, and then drying in an air bath having a temperature above that of the atmosphere and a pressure below that of the atmosphere until the moisture content of the wood is substantially equal to that of the same wood when dried by exposure to the atmosphere.

19. The method of preparing wooden separators for use in batteries which consists in subjecting the same to a chemical bath to affect certain constituents, subsequently washing the same to remove the chemicals and affected constituents, restraining the same from warping, and then while so restrained drying the same *in vacuo*.

20. The method of preparing wooden separators for use in batteries which consists in subjecting the same to a chemical bath to affect certain constituents, subsequently washing the same to remove the chemicals and affected constituents, restraining the same from warping, and then while so restrained drying the same *in vacuo* until the moisture content is substantially the same as that of the natural wood air dried.

GUSTAV H. RABENALT.